United States Patent [19]
Manabe

[11] Patent Number: 5,280,949
[45] Date of Patent: Jan. 25, 1994

[54] AIR BAG DEVICE FOR AUTOMOBILE

[75] Inventor: Toshiyuki Manabe, Hiroshima, Japan

[73] Assignee: Mazda Motor Corporation, Hiroshima, Japan

[21] Appl. No.: 930,441

[22] Filed: Aug. 18, 1992

Related U.S. Application Data

[63] Continuation of Ser. No. 677,405, Apr. 1, 1991, abandoned.

[30] Foreign Application Priority Data

Mar. 30, 1990 [JP] Japan .................. 2-34775

[51] Int. Cl.⁵ .............................. B60R 21/16
[52] U.S. Cl. ............................. 280/731
[58] Field of Search ........ 280/728 A, 731, 735, 280/741 R, 743

[56] References Cited

U.S. PATENT DOCUMENTS

| | | | |
|---|---|---|---|
| 4,148,503 | 4/1979 | Shiratori et al. | 280/731 |
| 4,325,568 | 4/1982 | Clark et al. | 280/731 |
| 4,913,461 | 4/1990 | Cuevas | 280/731 |
| 4,938,504 | 7/1990 | Fukuda et al. | 280/731 |
| 4,974,873 | 12/1990 | Kaiguchi et al. | 280/735 |
| 5,056,814 | 10/1991 | Shiraki et al. | 280/731 |

FOREIGN PATENT DOCUMENTS

| | | | |
|---|---|---|---|
| 62-234781 | 10/1987 | Japan . | |
| 0184549 | 7/1988 | Japan | 280/743 |
| 3182115 | 7/1988 | Japan | 280/743 |
| 0235144 | 9/1988 | Japan | 280/743 |
| 0249743 | 10/1990 | Japan | 280/743 |

*Primary Examiner*—Margaret A. Focarino
*Assistant Examiner*—Paul Dickson
*Attorney, Agent, or Firm*—Keck, Mahin & Cate

[57] ABSTRACT

An automobile air bag system for restraining and protecting a driver upon a collision includes a modular air bag device which is installed, as a subassembled unit, in a steering wheel. The modular air bag device has at least an air bag capable of unfolding and an electrically operated inflator unit for generating gas and inflating and unfolding the air bag with the gas. A bottom cover, assembled to a bottom of the air bag device, covers and protects at least a portion of a harness extending from and laying under the bottom of the air bag device against damage.

7 Claims, 4 Drawing Sheets

AIR BAG DEVICE FOR AUTOMOBILE

This is a continuation of application Ser. No. 07/677,405, filed Apr. 1, 1991, now abandoned.

BACKGROUND OF THE INVENTION

1. Field of the Invention

The present invention relates to an air bag device for an automobile, and, more particularly, to an automobile air bag device with a protector member disposed so as to protect an igniter harness of an air bag module.

2. Description of Related Art

An air bag device has hitherto been put into use with an air bag module mounted or installed in a steering wheel During assembly, the air bag module is, after mounting the steering wheel on the upper end of the steering column, installed in the steering wheel.

Such an air bag module typically comprises an inflator, such as a gas generating unit, and an igniter, in addition to the air bag. Since the igniter is connected to a plurality of collision sensors mounted on the front portion of the vehicle and to an electrical supply, an igniter harness is necessarily connected to the air bag module. This kind of igniter harness extends from the rear surface of the inflator to the outside of the air bag module, as described in, for example, Japanese Unexamined Patent Publication 62-234781.

In a car assembly factory, the air bag module, when it is being conveyed and stored, is positioned in the form of a subassembly on a storage pallet. The upper surface of the subassembled air bag module is covered by a synthetic resin module cover, serving as an ornamental member of the steering wheel. As it is preferable to avoid soiling or damaging the module cover during car assembly, the air bag module is positioned with its rear surface facing downwards on the storage pallet. However, in this case, the harness for the igniter is apt to bend at a portion which extends toward the rear surface of the air bag module and, particularly, at a portion near the outlet opening of the inflator. If the air bag module is placed and left in such a state for a long period, the harness may be damaged.

In a case in which the structural rigidity of the steering wheel is insufficient, moreover, when the air bag unfolds during a collision of the vehicle, the unfolded air bag will oscillate from side to side. A deviation from a desired normal position of the unfolded air bag is, therefore, produced.

SUMMARY OF THE INVENTION

A primary object of the present invention is to provide a modular air bag device for an automotive vehicle for restraining and protecting a driver upon a collision of the vehicle.

Another object of the present invention is to provide a modular air bag device for an automotive vehicle which reliably prevents the harness of an igniter subassembled in the air bag module from damage.

These objects of the invention are accomplished by providing a particularly constructed air bag module which is to be positioned or installed in a steering wheel The modular air bag device, which is to be installed as a subassembled unit in a steering wheel, has at least an air bag capable of unfolding, and an electrically operated inflator unit having an igniter harness extending out therefrom. The inflator unit generates gas and inflates and unfolds the air bag. A bottom cover, assembled to a bottom of the air bag device, covers and protects at least a portion of the igniter harness, which extends from and lays under the bottom of the air bag device, from being bent or damaged.

Such an air bag module, with the cover member pre-assembled, can reliably protect the igniter harness laying under the air bag module against bending or damage during storage or transfer of the air bag module on a storage pallet in an automobile assembling plant.

BRIEF DESCRIPTION OF THE DRAWINGS

The above and other objects and features of the present invention will be apparent from the following detailed description of a preferred embodiment thereof when considered in conjunction with the appended drawings, in which similar reference numerals have been used to designate the same or similar elements throughout the drawings, and wherein.

DETAILED DESCRIPTION OF THE PREFERRED EMBODIMENTS

Figure 1:
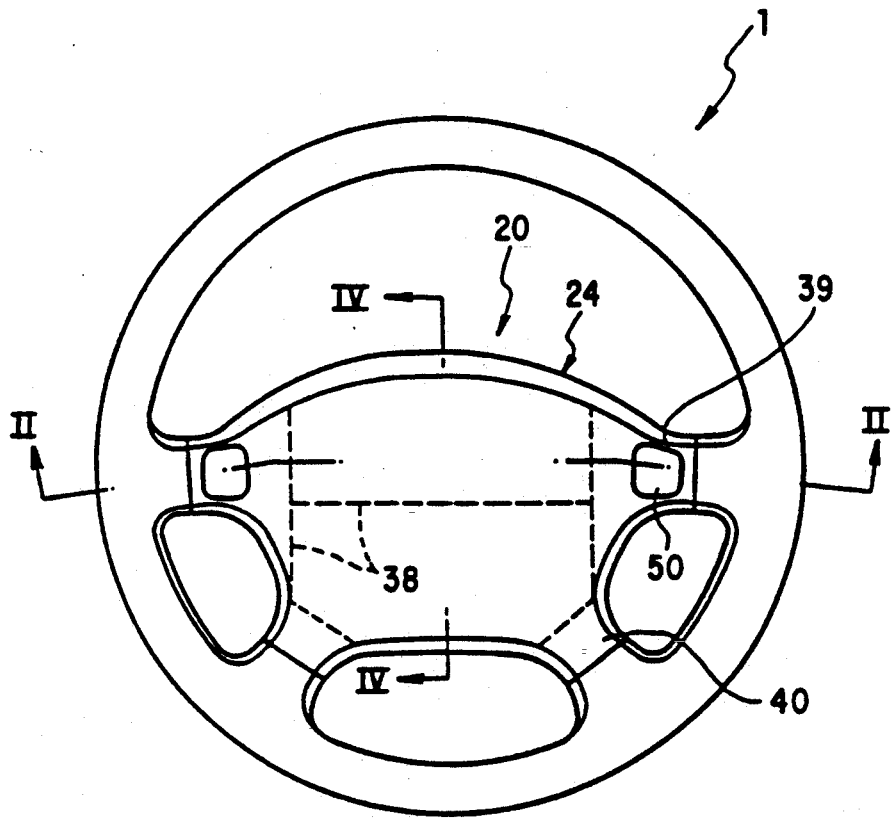
FIG. 1 is a plan view of a steering wheel in which an air bag module in accordance with a preferred embodiment of the invention is installed.

Referring to the drawings in detail and, in particular, to FIGS. 1 to 4, an air bag device in accordance with a preferred embodiment of the present invention is shown as being suitably assembled to or installed in a steering wheel. The steering wheel, generally designated 1, is typically provided with a wheel baseplate 2, having a generally rectangular shape and a peripheral flange 2a. The steering wheel is further provided with a transverse spoke 3, secured to the upper surface of the wheel baseplate 2, extending from left to right Two upright spokes 4 extend obliquely downwards from the right-hand and left-hand ends of the wheel baseplate 2, respectively, and a circular wheel body 5 is secured to the outer ends of the transverse spoke 3 and to the upright spokes 4. These spokes 3 and 4 are each formed with a U-shaped cross-section which opens downwards The wheel baseplate 2 is provided with a boss 6 secured thereto and is mounted on a steering shaft 7 by spline-coupling between the boss 6 and splines 7a of the shaft 7. The steering wheel 1 is secured to the upper end of the steering shaft 7 by means of a fastening nut 8.

Wheel baseplate 2 is positioned at a predetermined distance below the wheel body 5. Left and right end portions 10 of the transverse spoke 3 are inclined outward and up as viewed from the wheel baseplate 2, and end portions 11 of the right-hand and left-hand upright spokes are also inclined outward and up as viewed from the wheel baseplate 2. An air bag module 20 is installed above the wheel baseplate 2. The wheel body 5 and the spoke end portions 10 and 11 are covered with a skin of synthetic resin material, and further, the lower surface of the steering wheel 1, inward from the spoke end portions 10 and 11, is covered with a cover member 9 of, for instance, metal or synthetic resin.

Spoke portions 10 and 11 of the spokes 3 and 4 are, respectively, provided with mounting seats 12 to mount the air bag module 20 on the steering wheel 1. The cover member 9 is formed with recesses 13, opening outside the mounting seat 12.

Figure 2:
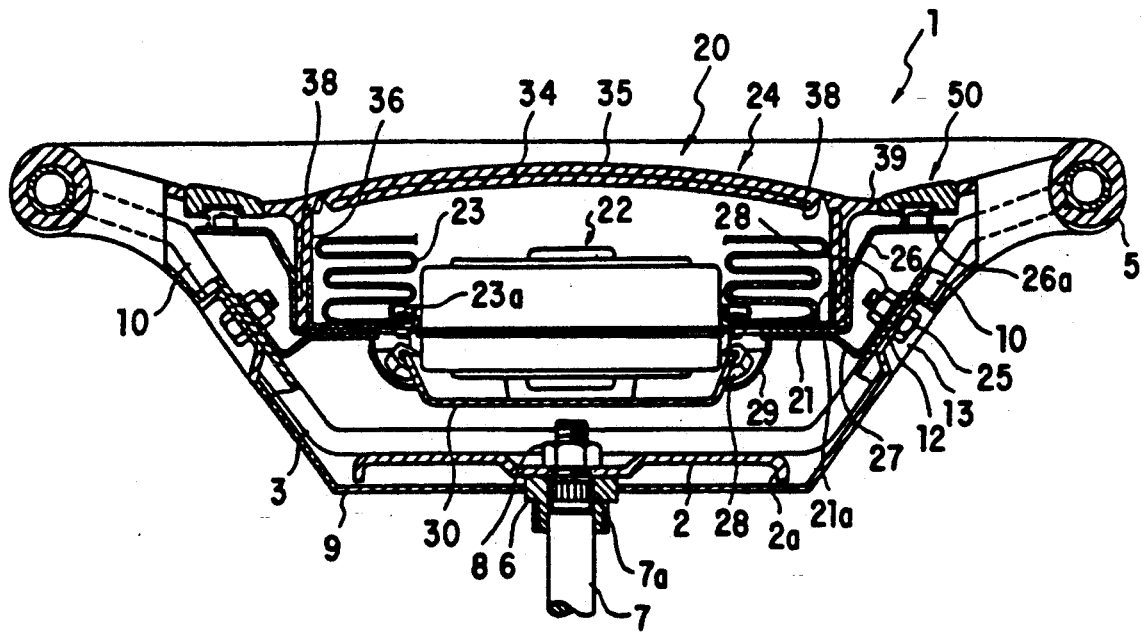
FIG. 2 is a cross-sectional view of FIG. 1 as seen along line II—II.
Figure 3:
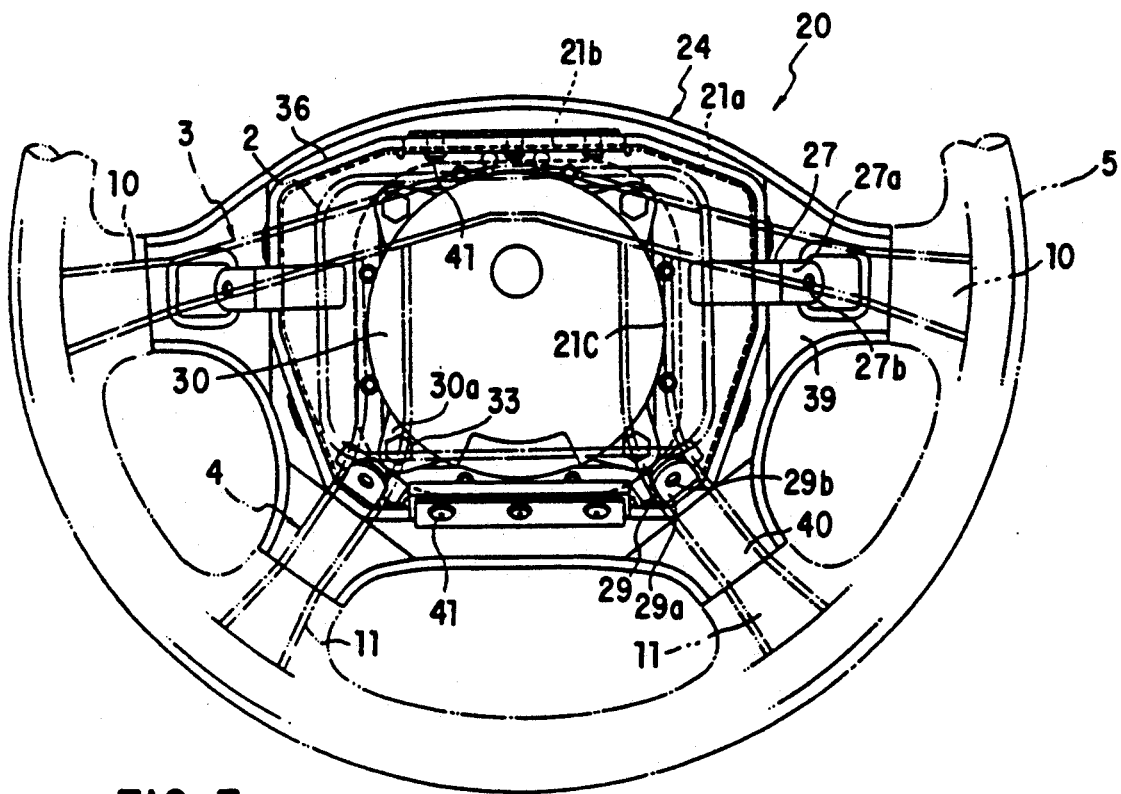
FIG. 3 is a bottom view of an air bag device in accordance with the preferred embodiment of the invention.
Figure 4:
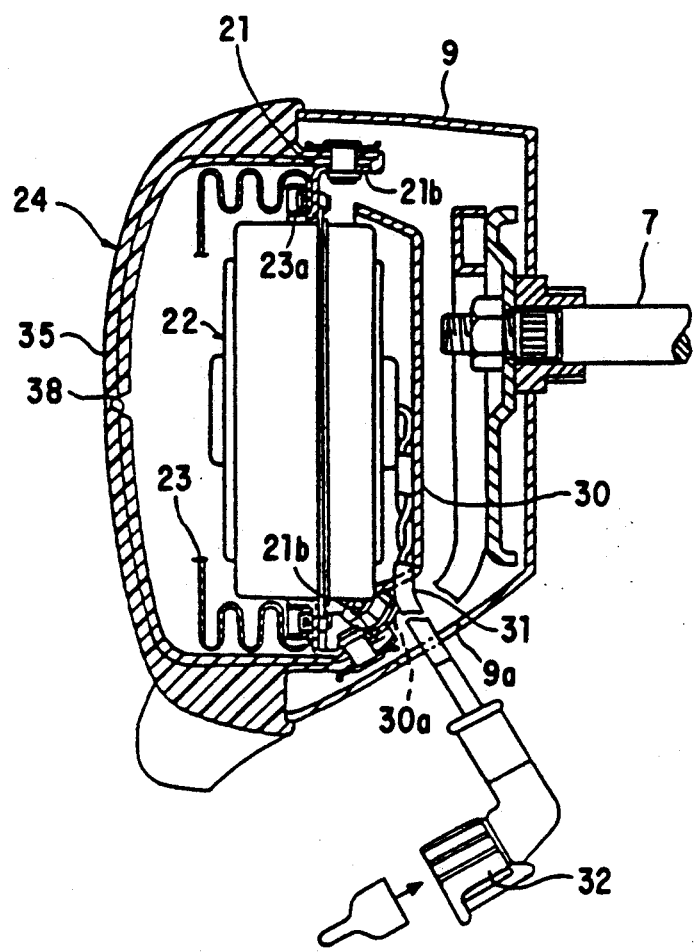
FIG. 4 is a cross-sectional view of FIG. 1 as seen along line IV—IV.
Figure 5:
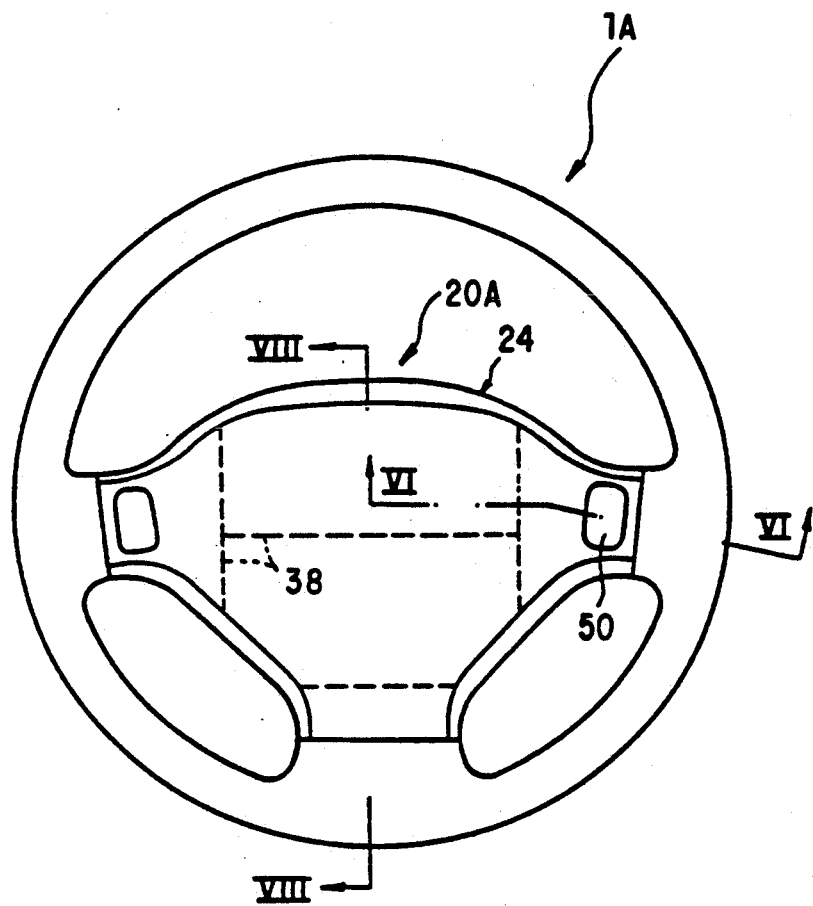
FIG. 5 a plan view, similar to FIG. 1, showing a steering wheel in which an air bag module is installed.
Figure 6:
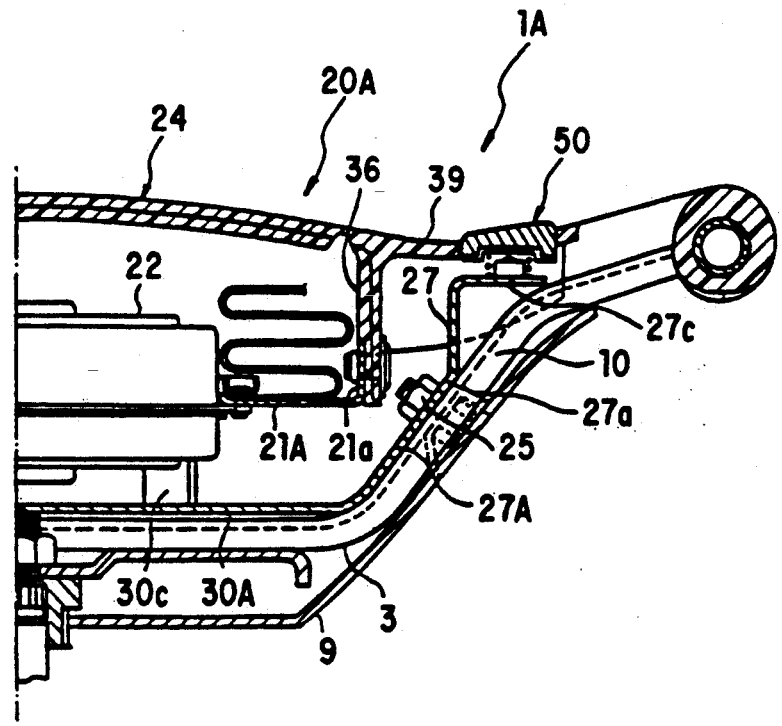
FIG. 6 is a cross-sectional view of FIG. 5 as seen along line VI—VI.
Figure 7:
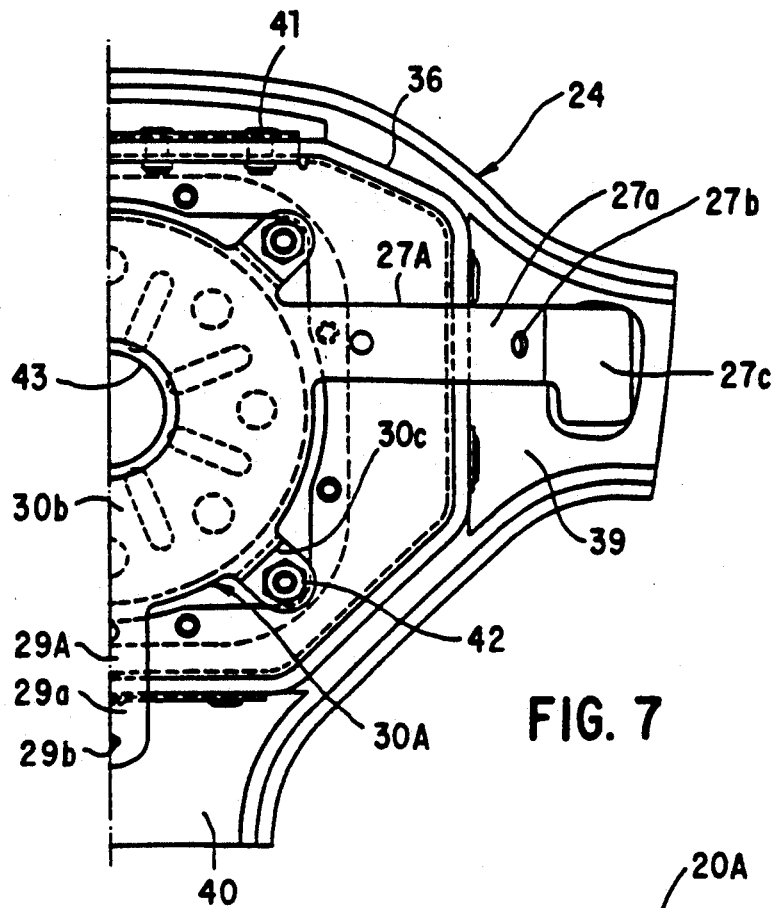
FIG. 7 is a bottom view of an air bag device in accordance with another preferred embodiment of the invention.
Figure 8:
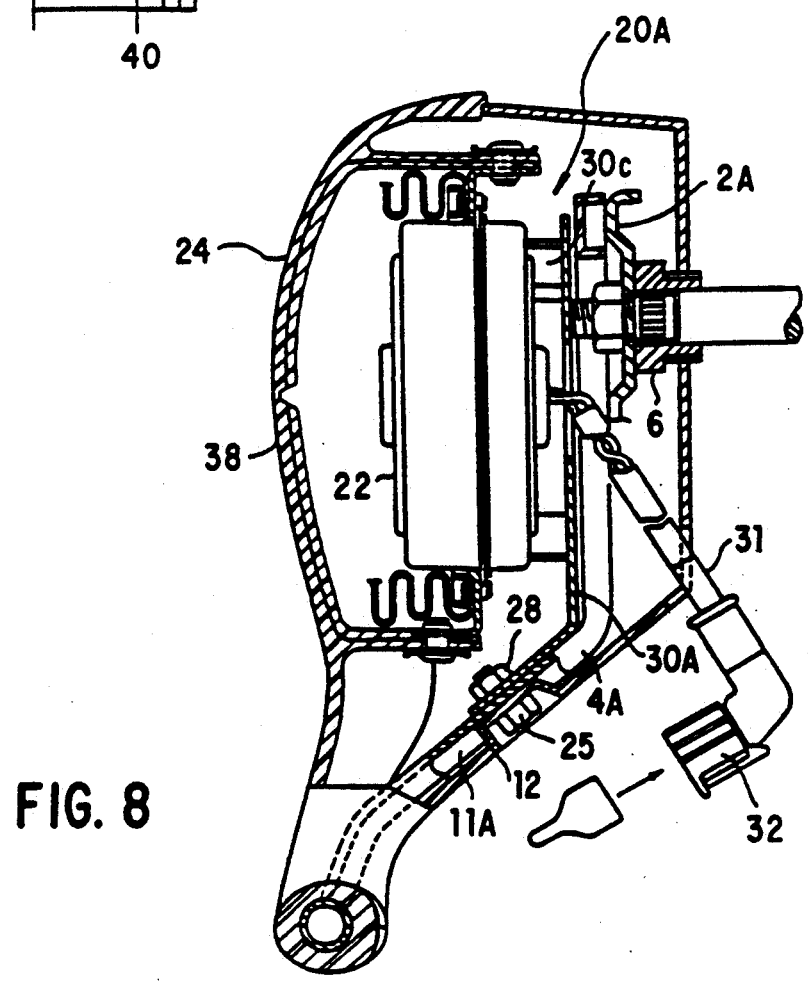
FIG. 8 is a cross-sectional view of FIG. 5 as seen along line VIII—VIII.

Air bag module 20 is formed by a module baseplate 21, an inflator unit 22, containing an igniter and an inflator 22I such as a gas generator which is schematically represented in FIG. 2, and a folded-up air bag 23, all of which are well known in the art. The inflator unit 22 is covered with a bottom cover 30 of synthetic resin attached to the lower side of the inflation unit 22 and with a top cover 24 of a synthetic resin attached to the upper side of the inflation unit 22. The inflation unit 22, inflator cover 30, air bag 23 and cover member 24, and associated essential parts, are previously assembled as the air bag module 20, and this air bag module 20 is fitted, by bolts 25, to the four spoke portions 10 and 11 of the spokes 3 and 4 of the steering wheel 1.

Module baseplate 21, made of a steel plate of approximately rectangular shape, is formed with a tubular wall 21a upstanding from the outer peripheral edge thereof. Baseplate extensions 26, bending up and extending above the upper sides of the spoke portions 10 of the spokes 3, are secured to the right-hand and left-hand corners of the module baseplate 21 for mounting horn switches 50 thereon Each module extension 26 is formed at its upper end with a mounting portion 26a on which the horn switch 50 is attached The module baseplate 21 is provided with leg members 27 secured to the right-hand and left-hand corners of the upper portion thereof and extending as far as the mid portions of the respective spokes 10. The leg member 27 is formed with a mounting extension 27a, including a bolt hole 27b, abutting the mounting seat 12 of the spoke portion 10. A nut 28 is secured to the mounting extension 27a in alignment with the bolt hole 27b. The module baseplate 21 is further provided with leg members 29, corresponding to respective spoke portions 11, which are secured to right-hand and left-hand corners of the under surface of the module baseplate 21 The leg member 29 is formed with a mounting extension 29a, including a bolt hole 29b, abutting the mounting seat of the spoke portion 11. A nut (not shown) is secured to the mounting extension 29a in alignment with the bolt hole 29b. The air bag module 20 is fitted to the steering wheel 1 by securing the mounting extensions 27a and 29a to the mounting seats 12 of the respective spoke portions 10 and 11 with fastening bolts 25 and nuts 28.

Inflation unit 22 is installed and fitted in a circular opening 21c formed in a central portion of the module baseplate 21. An inflator, such as a gas generator, of the inflation unit 22 is electrically connected to a plurality of collision detection sensors (not shown) and an external electrical power supply (not shown) via a harness 31 with a connector 32 When the collision detection sensors are actuated by a collision of the automotive vehicle, a heater of the inflator is supplied with electric power so as to actuate the inflator and instantaneously generate a large quantity of gas to inflate and unfold the air bag 23.

Bottom cover 30, covering the bottom of the inflator unit 22, is shaped in the form of a dish with a given depth, and is made of synthetic resin material The bottom cover is disposed with sufficient empty space left between it and the lower surface of the inflator 22 for the harness 31 to extend between the bottom cover and the inflator. The inflator cover 30 is assembled to the module baseplate 21 by securing brackets 30a at its corners to the module baseplate 21 by bolts 33 The lower surface of the inflator bottom cover 30 is made flat and is assembled as a part of the air bag module 20. The harness 31, extending along the inside of the inflator bottom cover 30 from the center of the lower surface of the inflator unit 22, is brought out through an opening 30a of the inflator bottom cover 30 and an opening 9a of the cover 9. Peripheral edge portion 23a of the opening of the air bag 23 is secured to a lip of the module baseplate 21 near the periphery of the inflator unit 22, such that the gas generated from the inflator unit 22 is supplied into the air bag 23.

Top cover 24, made of a synthetic resin with a fabric net 34 embedded therein, comprises a top wall 35 which covers the upper surface of the steering wheel 1, except for the wheel body 5, and a peripheral wall 36 which is formed integrally with the upper wall 35 and which covers the air bag 23.

Top wall 35 of the top cover 24 is formed with an approximately H-patterned rupturable groove 38 in the inner surface thereof, as shown in FIGS. 1 and 2. The H-patterned rupturable groove 38 is ruptured as the air bag 23 unfolds Integrally formed with the top cover 24 are extensions 39, extending radially outward from the top wall 35, which cover the upper surfaces of the left-hand and right-hand spoke portions 10, respectively, and radially outwardly extending extensions 40 which cover the upper surfaces of each of the left-hand and right-hand spoke portions 11, respectively.

Peripheral wall 36 prevents the air bag 23 from accidentally actuating the horn switches 50, or becoming entangled with the horn switches 50, while the air bag 23 unfolds, so as to allow the air bag 23 to unfold and expand quickly, guided by the peripheral wall 36. The peripheral wall 36 of the top cover 24 is secured to the peripheral wall 21a of the baseplate 21, and the module baseplate 21 is formed with flanges 21b extending downward at central positions of upper and lower edges thereof. The top cover 24 is mounted on the module baseplate 21 with the peripheral wall 36 secured to the downwardly extending flanges 21b by rivets 41.

In assembling the air bag device to the automotive vehicle, the air bag module 20, having been assembled beforehand as a subassembled module, is fitted to the steering wheel 1 only by securing the four mounting extensions 27a and 29a to the four spoke portions 10 and 11, respectively, with bolts 25.

Because the top cover 24 of the air bag module 20 is formed with the peripheral wall 36 which covers the outer periphery of the air bag 23 and by which the air bag 23 is isolated from the horn switches 50, the air bag 23, during inflating and unfolding, does not become entangled in the vicinity of the horn switches 50, but reliably and completely unfolds under the guidance of the peripheral wall 36.

Because the inflator bottom cover 30, disposed so as to cover the lower surface of the inflator unit 22 and to protect the harness 31, is subassembled in the air bag module 20, the air bag module 20, when stored on a storage pallet and the like after having been subassembled, can be positioned on the storage pallet with the inflator bottom cover 30 placed down, so as to protect the upper surface of the top cover 24 and the harness 31 from damage or scratches.

Referring to FIGS. 5 to 8, there is shown an air bag device in accordance with another preferred embodiment. A steering wheel 1A is equipped with transverse spokes 3 extending to the left and right, a wheel baseplate 2A, which is smaller in size than the wheel baseplate 2 of the previous embodiment, and a single wide upright spoke 4A extending vertically. These spokes 3 and 4A are formed with spoke end portions 10 and 11A, respectively. An air bag module 20A is assembled in the steering wheel through these spoke end portions 10 and 11A. An inflator top cover 30A, made of sheet steel, is formed with integral leg members 27A and 29A extending below the inflator unit 22 toward above the respective spoke end portions 10 and 11A. A module baseplate 21A is formed with an opening, and the inflator unit 22 is held in the opening of the module baseplate 21A. The module baseplate 21A is formed with a peripheral wall 21a extending upwards from the peripheral edge thereof and riveted to a downwardly extending peripheral wall 36 of a top cover 24.

Similarly to the extension 26 of the previous embodiment, mounting extensions 27a of the leg members 27A, which include bolt holes 27b, extend to above the spoke end portions 10, respectively, and are secured by bolts 25 to the spoke end portions 10. Mounting seats 27c are formed at the ends of the mounting extensions 27a to mount horn switches 50 thereon. Similarly to the extension of the leg 29 of the previous embodiment, a mounting extension 29a of the leg member 29, with a bolt hole 29b, is secured to a mounting seat 12 of the spoke portion 11A. A nut 28 is secured to the mounting extension 29a in alignment with the bolt hole 29b. The mounting extension 29a is secured to the spoke end portion 11A by a bolt 25 and nut 28.

Body portion 30b of the inflator top cover 30A is of approximately circular disk shape, and is disposed with a predetermined space left below the inflator unit 22. Upper ends of four brackets 30c, extending upwards from the body portion 30b of the inflator top cover 30A, are secured to the lower portion of the module baseplate 21A by bolts 42. The inflator top cover 30A is provided with a relatively large opening 43, formed centrally of the body portion 30b, through which a harness 31, extending from the central portion of the lower surface of the inflator unit 22, extends out.

Subassembling of the air bag module 20A is completed by assembling first the inflator unit 22, the air bag 23 and the inflator top cover 24 to the module baseplate 21A, then, the inflator bottom cover 30A to the inflator unit 22, and finally the horn switches 50 to the mounting seats 27c of the mounting extensions 27a of the leg members 27A.

When storing the air bag module 20A, subassembled in such a way as described above, in position on a storage pallet and the like, the air bag module 20 is placed onto the pallet with the inflator bottom cover 30A facing down. In this case, even though the harness 31 is placed below the inflator bottom cover 30A, because there is a space between the inflator unit 22 and the inflator bottom cover 30A, and because the opening 43 of the inflator bottom cover 30A is sufficiently large, the harness 31 is prevented from being bent in a right angle at a base end portion close to the inflator unit 22.

Furthermore, because the air bag module 20A is firmly mounted on the steering wheel 1A through the steel sheet inflator cover 30A and because the steering wheel 1A is reinforced by the steel sheet inflator cover 30A, the air bag 23 is not subjected to an oscillating motion during its inflation and expansion.

It is to be understood that although the invention has been described in detail with respect to preferred embodiments thereof, nevertheless, various other embodiments and variants are possible which are within the spirit and scope of the present invention, and such other embodiments and variants are intended to be covered by the following claims.

I claim:

1. In combination, an air bag system for restraining and protecting a driver upon a collision and a steering wheel in which said air bag system is installed, comprising:

a circular wheel body;

a wheel baseplate;

spokes, securely fixed to a surface of the wheel baseplate, provided between said circular wheel body and said wheel baseplate;

an air bag module installed as a unit to said steering wheel and including (a) a module baseplate formed with an opening, (b) an electrically operated inflator means for generating gas housed in a casing shell held in said opening, said casing shell extending through said opening, (c) an air bag, capable of unfolding, secured to a lip of said module baseplate surrounding said opening of said module baseplate, said electrically operated inflator means inflating and unfolding said air bag when said gas is generated, (d) a top cover overlying said inflator means and said air bag, and (e) a bottom cover assembled to said module baseplate and underlying a bottom of said casing shell;

a harness for supplying electric current to said electrically operated inflator means, at least a part of said harness being interposed between said bottom of said casing shell and said bottom cover of said air bag module so that said bottom cover of said air bag module covers and protects said part of said harness;

a cover member enclosing said module baseplate, said inflator means, said air bag, said bottom cover, and at least a part of said harness between the cover member and said top cover; and means for directly connecting said module baseplate, said spokes and said cover member together to secure said air bag module to said steering wheel, said bottom cover being interposed between said wheel baseplate and said bottom of said casing shell when said air bag module is secured to said steering wheel.

2. An air bag system and steering wheel combination as defined in claim 1, wherein said module baseplate comprises a substantially rectangularly shaped bottom portion formed with said opening and a long portion through which said air bag module is assembled to said steering wheel.

3. An air bag system and steering wheel combustion as defined in claim 2, wherein said module baseplate further comprises a mounting portion, extending upward from a peripheral edge of said substantially rectangularly shaped bottom portion, for supporting a horn switch.

4. An air bag system and steering wheel combustion as defined in claim 3, wherein, said top cover comprises a substantially rectangularly shaped cover portion and a protecting wall portion extending downward from said substantially rectangularly shaped cover portion, between said air bag and said mounting portion, for protecting said air bag during an inflation of said air bag.

5. An air bag system and steering wheel combination as defined in claim 4, wherein said top cover further comprises a flexible portion extending from said substantially rectangularly shaped cover portion over said mounting portion, said flexible portion actuating said horn switch when it is bent.

6. An air bag system and steering wheel combination as defined in claim 4, wherein said top cover comprises a body made of a synthetic resin and a fabric net embedded in said body.

7. An air bag system and steering wheel combination as defined in claim 4, and further comprising an ornamental skin of a synthetic resin covering an outer surface of said top cover.

* * * * *